(12) United States Patent
McCue

(10) Patent No.: US 6,450,542 B1
(45) Date of Patent: Sep. 17, 2002

(54) FIRE HYDRANT HOSE ADAPTER

(76) Inventor: David N. McCue, Box 35 DC, R.R.#2, Carrying Place, ON (CA), K0K 1L0

( * ) Notice: Subject to any disclaimer, the term of this patent is extended or adjusted under 35 U.S.C. 154(b) by 0 days.

(21) Appl. No.: 09/870,696

(22) Filed: Jun. 1, 2001

(51) Int. Cl.[7] .............................................. F16L 25/00
(52) U.S. Cl. ...................... 285/12; 285/148.19; 285/73; 285/376
(58) Field of Search .............................. 285/12, 65, 73, 285/376, 401, 148.19

(56) References Cited

U.S. PATENT DOCUMENTS

| | | | | |
|---|---|---|---|---|
| 489,107 A | * | 1/1893 | Storz | 285/376 |
| 774,196 A | * | 11/1904 | Nunn | 285/376 |
| 911,123 A | * | 2/1909 | Fuller | 285/376 |
| 1,075,703 A | * | 10/1913 | Eubank | 285/376 |
| 3,427,053 A | * | 2/1969 | Dunlap | 285/12 |
| 4,000,753 A | | 1/1977 | Ellis | |
| 4,133,312 A | * | 1/1979 | Burd | 285/332 |
| 4,266,813 A | * | 5/1981 | Oliver | 285/12 |
| 4,402,531 A | * | 9/1983 | Kennedy, Jr. | 285/376 |
| 4,688,833 A | * | 8/1987 | Todd | 285/376 |
| 4,708,370 A | | 11/1987 | Todd | |
| 5,301,985 A | * | 4/1994 | Terzini | 285/376 |
| 5,472,025 A | * | 12/1995 | Conrad et al. | 285/377 |
| 5,667,251 A | | 9/1997 | Prest | |
| 5,921,586 A | | 7/1999 | Prassas | |
| 5,971,438 A | * | 10/1999 | Johnson | 285/12 |
| 6,102,450 A | | 9/2000 | Harcourt | |
| 6,170,882 B1 | * | 1/2001 | Prest | 285/12 |

* cited by examiner

Primary Examiner—Eric K. Nicholson
(74) Attorney, Agent, or Firm—Dowell & Dowell, P.C.

(57) ABSTRACT

An adapter for use in coupling fire hoses and the like, of two different diameters, to a single selected port on a fire hydrant is described. A rigid tubular member is provided with a thread at one end to releasably attach to a complementary thread at the hydrant port, and with a second thread at the other end to which the smaller diameter hose can be directly secured. Intermediate the ends of the tubular member one half of a Storz quick release fitting is mounted concentrically thereon to receive a complementary Storz fitting on the end of a larger diameter hose. Mirror image adapters for use at the truck end of the hoses are also described. The adapters can be semi-permanently mounted on fire hydrants if desired and the threaded ends protected by removable covers.

7 Claims, 6 Drawing Sheets

FIRE HYDRANT HOSE ADAPTER

FIELD OF INVENTION

This invention relates to hose couplings and more particularly to fire hose couplings adapted to be mounted on either a fire hydrant or a fire truck and capable of coupling hoses of different diameters and/or different end fitting types.

BACKGROUND OF INVENTION

Fire hydrants are typically provided with two or three 2½" ports and one 4" port, all provided with male threaded fittings to which firefighters attach their hoses. For many years almost all fire departments used hoses which could be screwed directly onto the 2½" fittings, but in more recent times many, but by no means all, departments have elected to use much larger diameter hoses, in the range of 4–6" and sometimes even greater, which are fitted with quick locking sealing rings of the well known Storz type (see U.S. Pat. No. 489,107 issued Jan. 3, 1893 to Carl August Guido Storz, which discloses the use of two coupling halves together with each coupling half comprising a ring (locking collar) and a sealing ring). This means that each fire truck has to carry Storz adapters which must be screwed into place on the hydrant before the hose can be used. This takes time and special spanners to achieve. Once installed the adapter is generally left in place until permission to clear the site has been given by the fire captain. If the fire happens to be a large one, involving more than one fire department or a number of trucks which are differently equipped, the next truck to require water from the hydrant may be equipped with 2½" hoses with screw fittings, which means that the Storz adapter must be removed before the new hose can be connected. This again takes time and there is a very real likelihood that the adapter will be mislaid or end up on the wrong truck. There is a need, therefore, for a single adapter which can be screwed onto the hydrant and which can accommodate either 2½" screw-on hoses or larger Storz-type fitted hoses. Conversely, there is also a need for an adapter which can be mounted on a fire truck so that hoses of different diameters and end fittings can be attached to the same port on the truck. Such an adapter is generally the mirror image of the adapter used on the hydrant.

OBJECT OF INVENTION

An object of the present invention is to provide coupling adapters for use with fire hydrants or fire trucks which can be used to connect selected hoses of different diameters.

Another object of this invention is to provide fire hydrants which are adapted to receive fire hoses of selected different diameters at a single selected port thereof.

Yet another object of this invention is to provide a protective cover for the adapter of the present invention.

BRIEF STATEMENT OF INVENTION

By one aspect of this invention there is provided an adapter for selectively attaching a first hose or a second hose, having a smaller diameter than said first hose, to port means having a diameter corresponding substantially to said smaller diameter hose, comprising: a substantially rigid tubular member having a thread at a first end thereof, adapted to be releasably engaged with a complementary thread in said port, and a thread at a second end thereof adapted to be releasably engaged with a threaded fitting at one end of said second hose; and one half of a Storz fitting securely and concentrically mounted on said tubular member, intermediate the ends thereof, and adapted to receive a complementary half of a Storz fitting at one end of said first hose.

By another aspect of this invention there is provided a fire hydrant having a plurality of ports of selected diameter and including adapter means for selectively attaching a first hose or a second hose, having a smaller diameter than said first hose, to a selected one of said ports having a diameter corresponding substantially to said smaller diameter hose, said adapter means comprising: a substantially rigid tubular member having a thread at a first end thereof, adapted to be releasably engaged with a complementary thread in said port, and a thread at a second end thereof adapted to be releasably engaged with a threaded fitting at one end of said second hose; and one half of a Storz fitting securely and concentrically mounted on said tubular member, intermediate the ends thereof, and adapted to receive a complementary half of a Storz fitting at one end of said first hose.

DETAILED DESCRIPTION OF PREFERRED EMBODIMENTS

Figure 1:
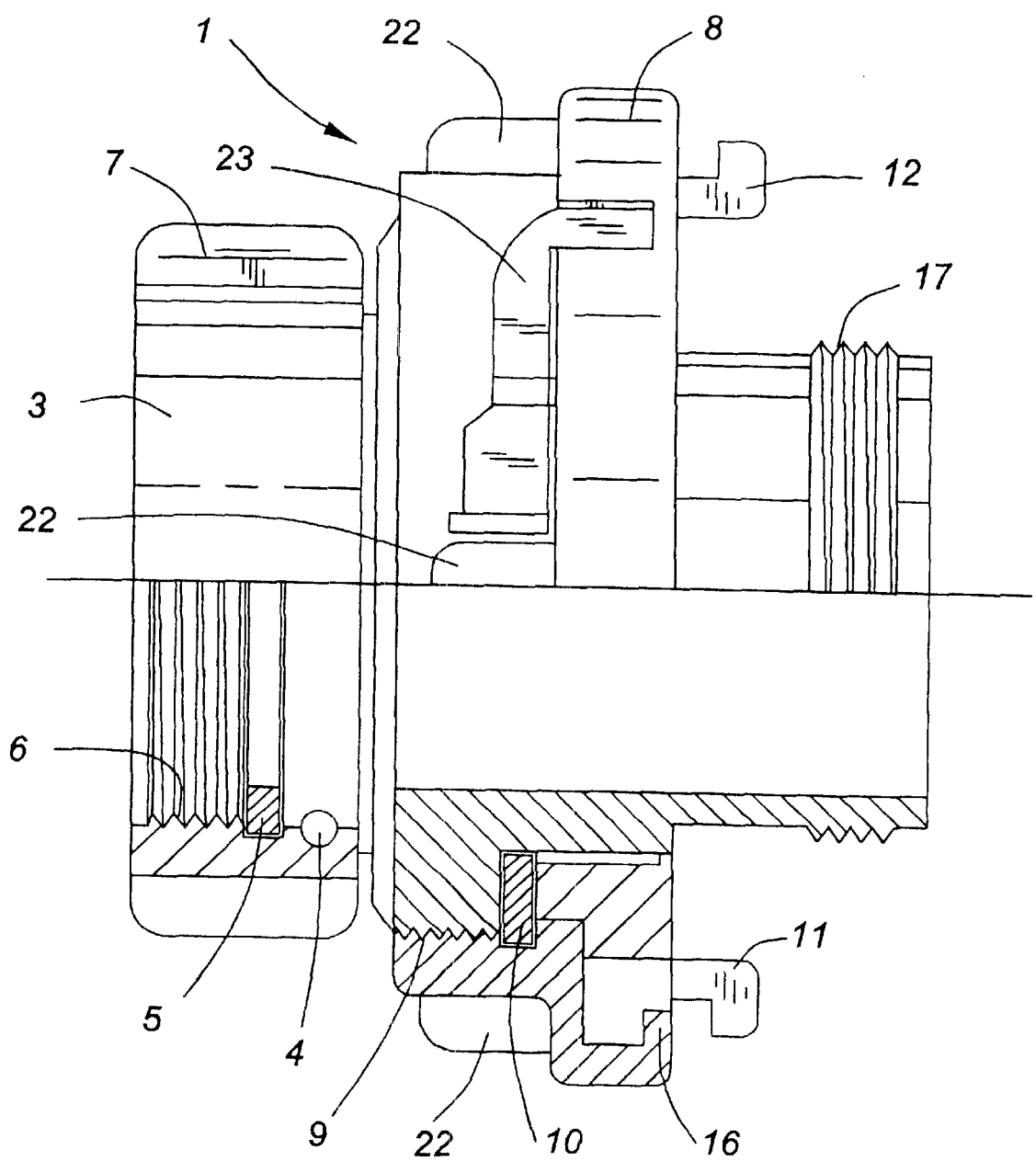
FIG. 1 is a side view, partly in section, of a first embodiment of the adapter of the present invention, for attachment to a fire hydrant.
Figure 5:
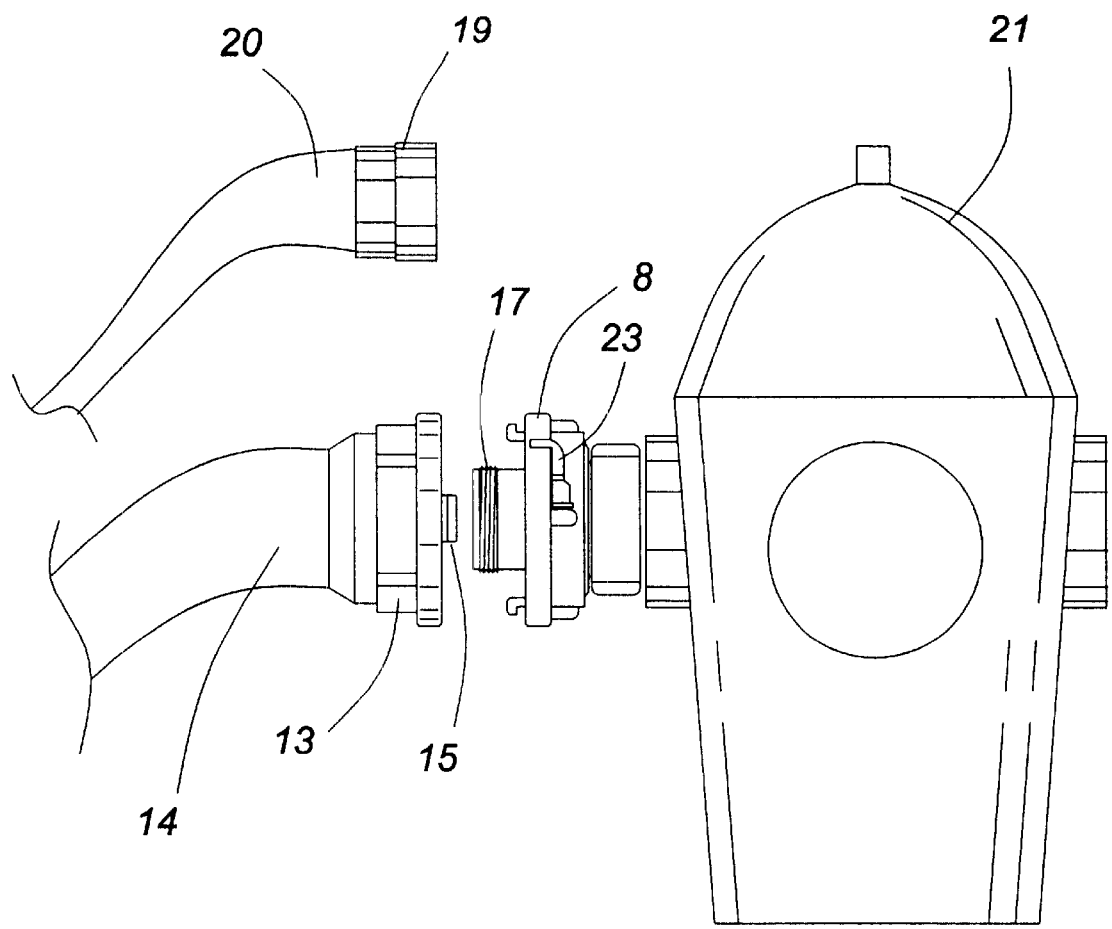
FIG. 5 is a sketch of a fire hydrant with the adapter of FIG. 1 mounted thereon and showing two hoses, of different diameters and end fittings, for mounting thereon.

As previously noted, fire hydrants, generally but not necessarily of the type shown in FIG. 5, are generally provided with a 2½" male pipe thread, either NPSH in Canada or NH in the United States, over which a female threaded releasable protective cover is fitted. When the cover is removed, a 2½" female threaded end of a fire hose can be screwed directly onto the male fitting. If it is desired to use a 4" (or greater) diameter hose with a Storz quick coupling, then a Storz adapter must first be mounted on the male end of the hydrant port. Such adapters are well known in the art and are commercially available, in various sizes and configurations, from such companies as W.S. Darley & Co. of Melrose Park, Ill., U.S.A. The adapter must, however, be removed before the hydrant can again be used with a 2½" hose. In FIG. 1 there is shown an adapter 1, that can be used with either a 2½" hose with a threaded fitting or a 4" (or greater, selected) diameter hose provided with a Storz quick locking connector without the necessity to change adapters. Adapter 1 comprises a metal, generally of aluminum or stainless steel, tubular member 2 having a circular swivel ring member 3 mounted on a ball race 4 at one end thereof. A rubber sealing gasket 5 is disposed at the end of tubular member 2, and swivel ring 3 is provided with an internal, or female, thread 6 adapted to releasably engage with the male thread on the 2½" port of a fire hydrant 21 (FIG. 5). Optionally, a plurality of finger lugs 7 is provided circumferentially around the swivel member 3. One half of a Storz connectors is securely and concentrically mounted on tubular member 2, intermediate the ends thereof by means of thread 9. Connector 8 includes rubber sealing rings 10, 11 and lugs 12 which releasably engage with corresponding flanges (not shown) in the other half of the Storz connector 13 at the end of a hose (as seen in FIG. 5). It will be appreciated that the half of the Storz connector 13 on hose 14 includes lugs 15 which releasably engage with flange 16 on connector half 8. The second end of tubular member 2 is provided with an external male thread 17 to which a complementary female ended fitting 19 on a 2½" hose 20. Storz connectors 8 and 13 may also include a plurality of finger lugs 22 spaced circumferentially around fittings 8 and 13 so as to provide tightening grips. Fitting 8 may also include a spring loaded locking device 23 to prevent accidental disengagement of mating parts 8 and 13 during operation.

Figure 2:
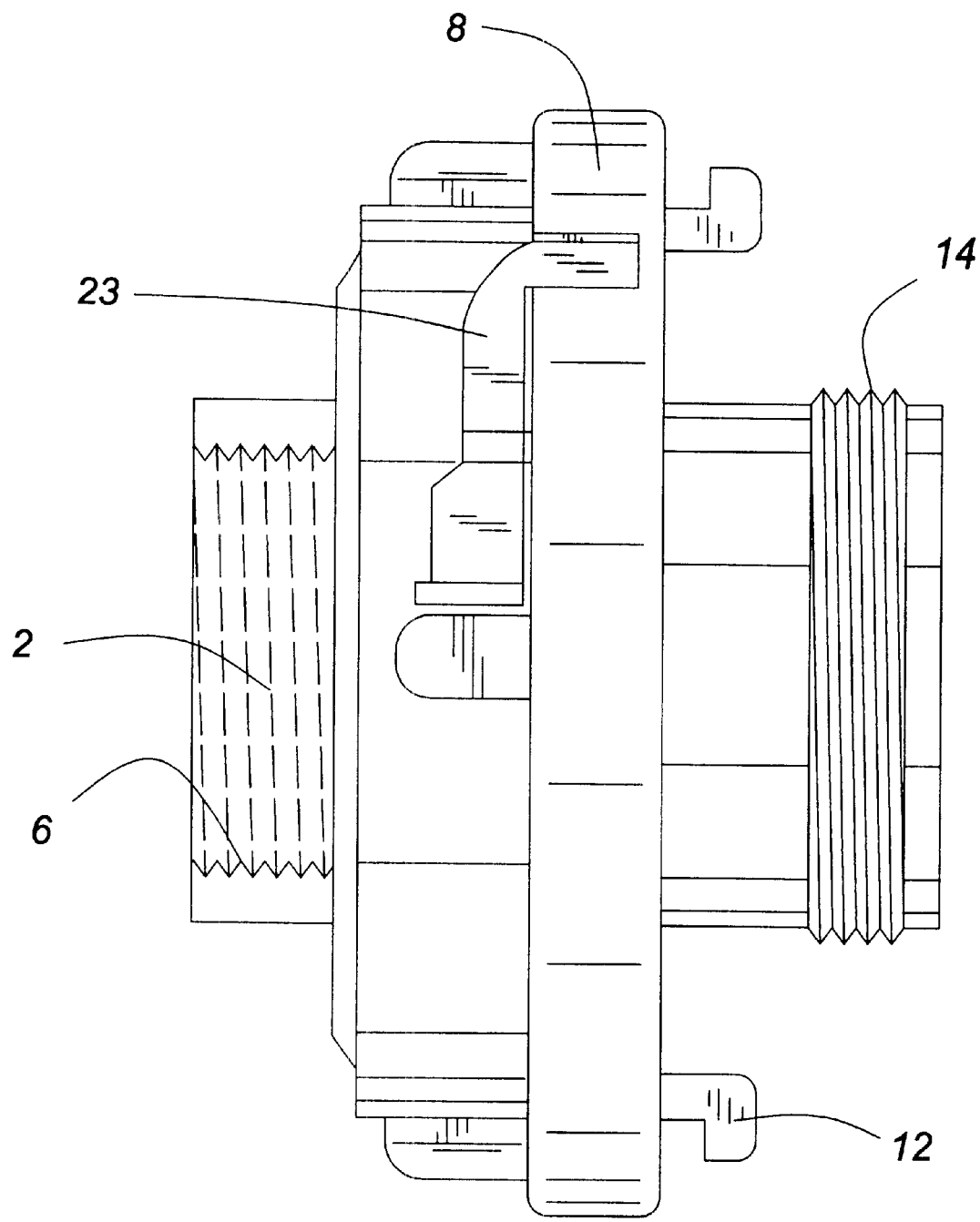
FIG. 2 is a side view, partly in section, of a modified version of the embodiment of FIG. 1.
Figure 6:
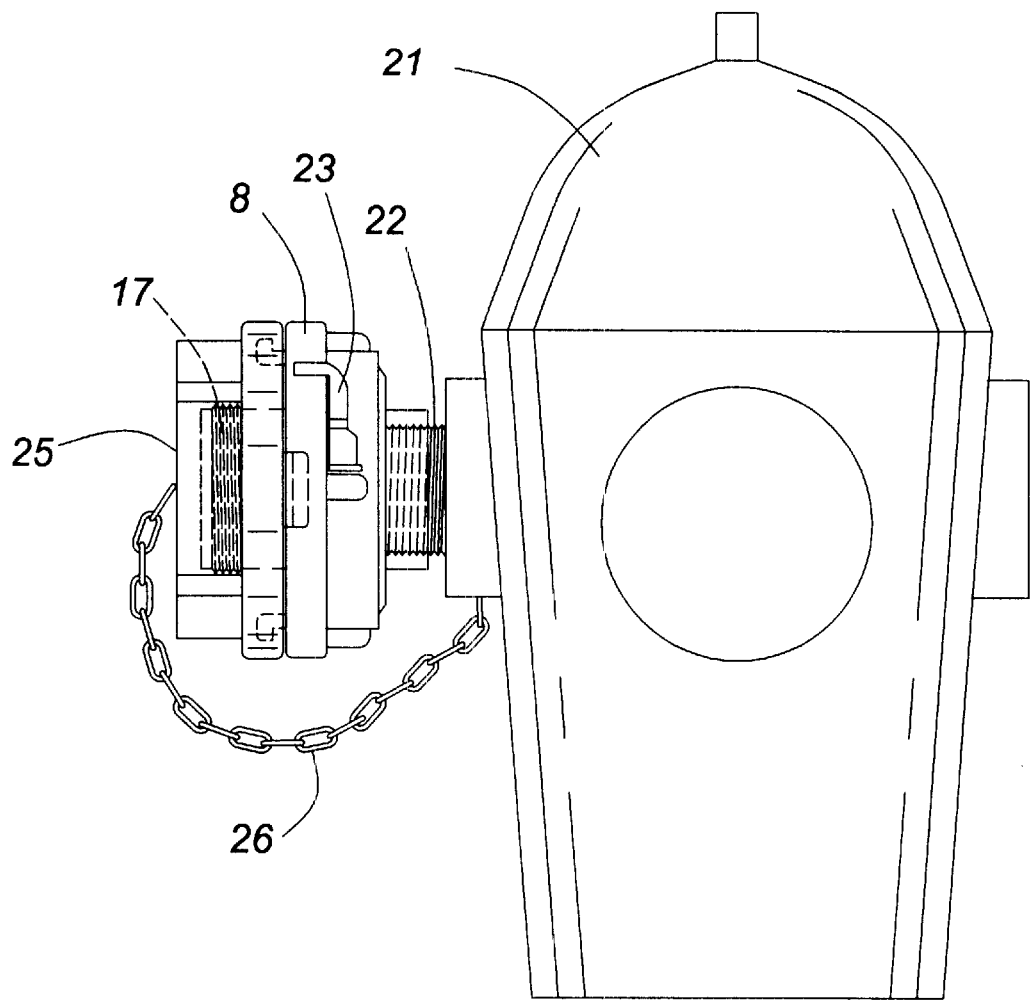
FIG. 6 is a sketch of a fire hydrant with the adapter of FIG. 2 mounted thereon and covered with a protective cover.

It will be appreciated by those skilled in the art that the swivel ring 3 in the embodiment of FIG. 1 is of primary value for quick assembly of the device 1 on a hydrant 21, but in certain circumstances it may be desired to mount an adapter device semi-permanently on the hydrant, in which case the swivel ring is not required and tubular member 2 is provided with a female thread 6, as seen more clearly in the alternative embodiment shown in FIG. 2, which is screwed directly onto the male thread on the port 24 of hydrant 21 (see FIG. 6). In all other respects the embodiment of FIG. 2 is the same as the embodiment shown in FIG. 1, and similar reference numerals have been used to identify similar parts.

Figure 3:
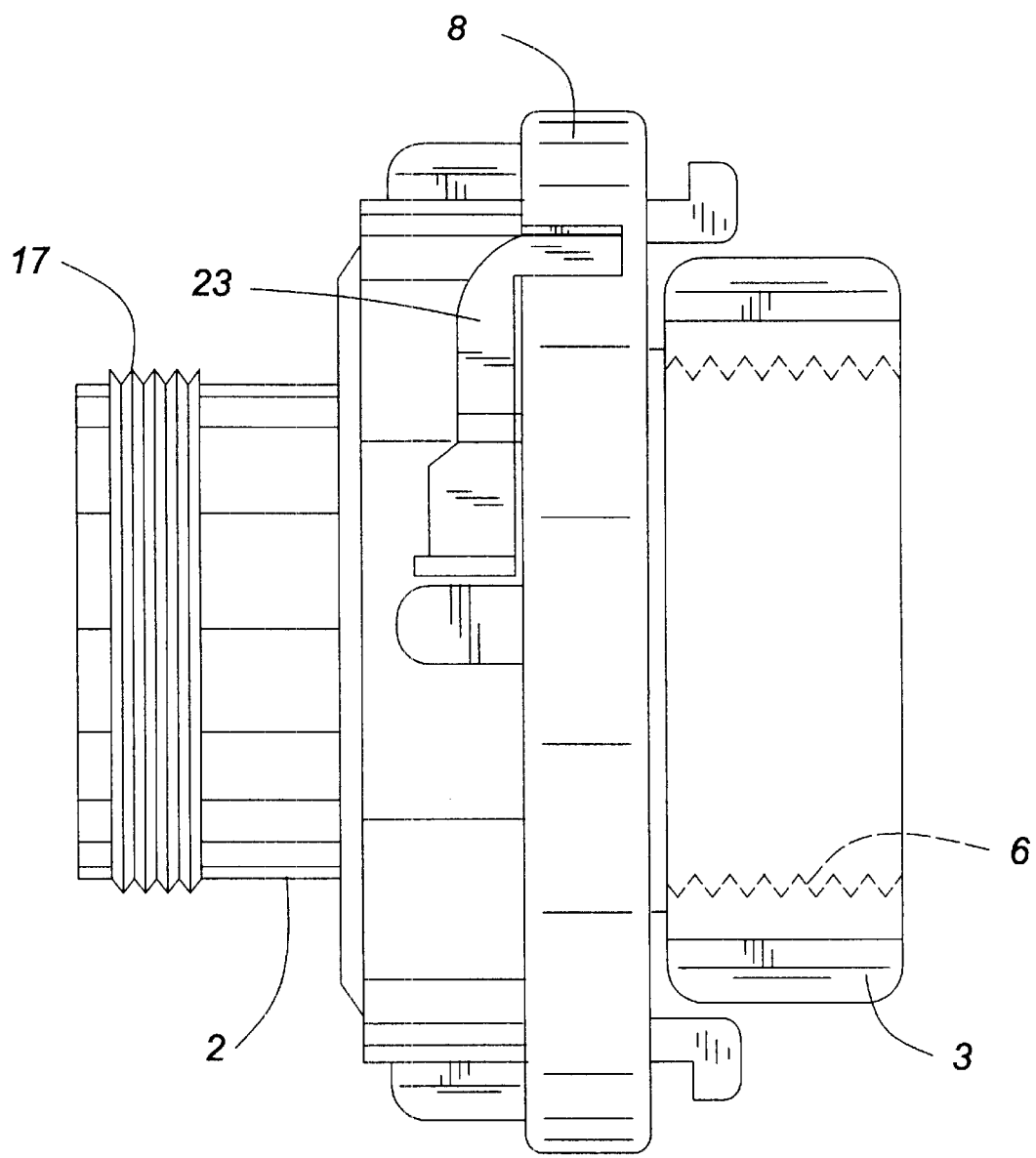
FIG. 3 is a side view, partly in section, of a second embodiment of the adapter of the present invention, for attachment to a fire truck.
Figure 4:
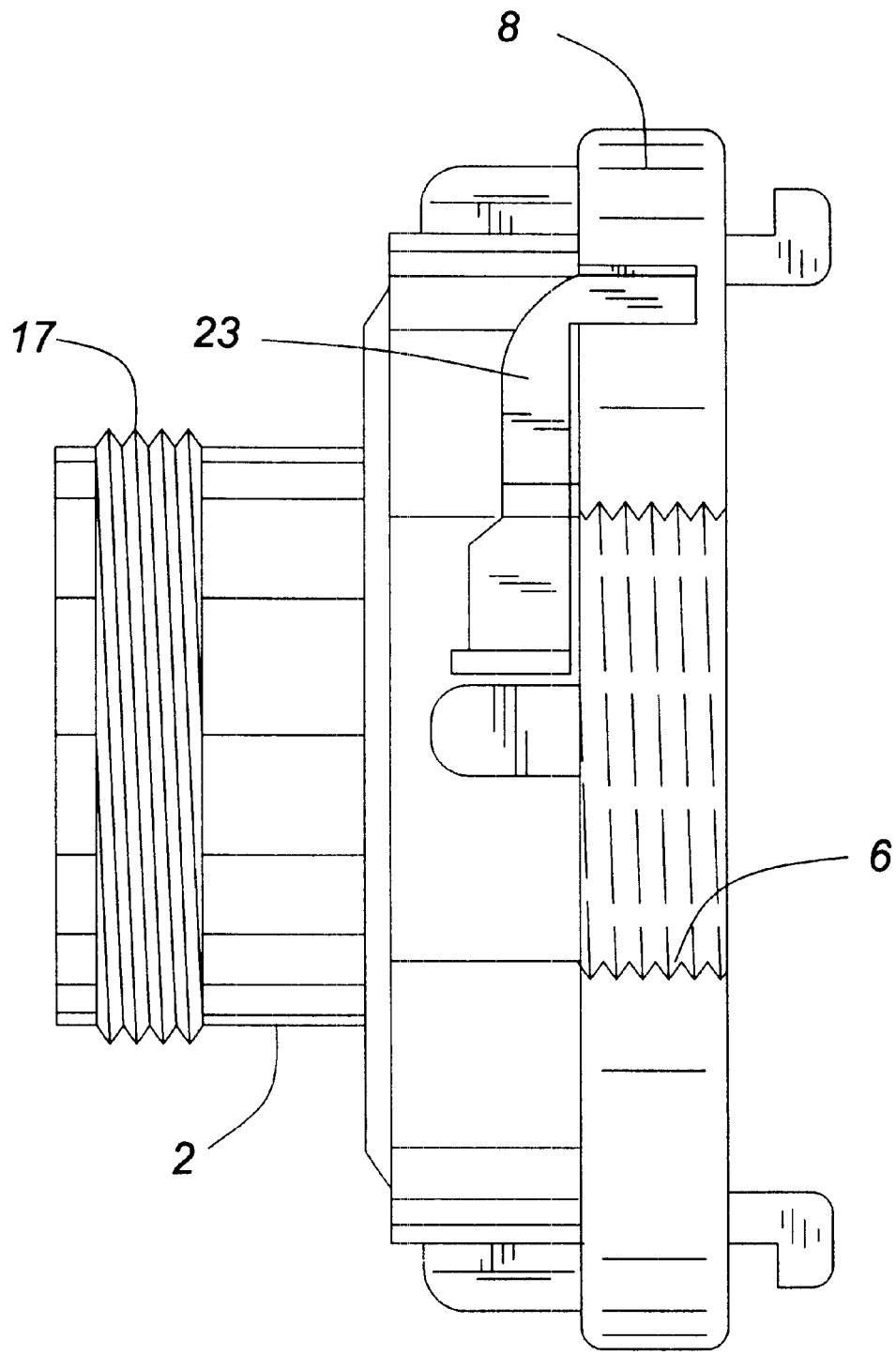
FIG. 4 is a side view, partly in section, of a modified version of the embodiment of FIG. 3.

It will also be appreciated by those skilled in the art that fire hoses are conventionally provided with one male end and one female end so as to facilitate quick joining of several lengths of hose. It is apparent, therefore, that the normal 2½" fitting on a fire truck will be provided with a female thread fitting (not shown) to receive the male thread fitting on the truck end of hose 20. While some trucks may be fitted with an appropriately sized Storz fitting as a secondary port, this is not always the case and the same situation as at the hydrant end pertains if it is operationally required to attach a large diameter Storz fitting hose to the truck, whether of the pumper or tank variety. Accordingly, a third embodiment of the adapter of the present invention may be provided as shown in FIG. 3, where similar parts are identified by the same reference numerals as in FIG. 1. The tubular member 2 is provided with a male thread 17 at the truck end of the adapter 25 which can be screwed into the female threaded port in the truck. At the hose end of adapter 25 there is provided a swivel ring 3 having an internal female thread 6 for connection to the male thread ending of hose 20, as described with reference to FIG. 1. Intermediate the ends of adapter 25 there is provided one half of a Storz fitting 8 for connection to the Storz fitting at the truck end of hose 14, again as described with reference to FIG. 1. In an alternative embodiment of FIG. 3, as shown in FIG. 4, the swivel ring 3 may be omitted and female thread 6 may be machined into tubular member 2, in a manner similar to that described with reference to FIG. 2. The embodiment of FIG. 4 is particularly useful to accommodate 2½" hose fittings inside the smaller sizes, such as 4", Storz fittings, where space to accommodate a swivel ring 3 is at a premium.

As noted above with reference to FIG. 6, it may be desired to mount the adapter 1 semi-permanently on hydrant 21, in which case a deep cap 25 (FIG. 6), provided with a Storz fitting at the open end thereof, may be provided to cover the exposed male thread 17 so as to prevent accidental damage or exposure to the elements over a long period of time. A tether chain 26 may also be provided in conventional manner.

While this invention has been described with particular reference to fire hoses and fire hydrants, it will be appreciated that the principles of this invention are not limited thereto and are equally applicable to many other environments where it is desired to connect hoses to sources of water or to static or mobile tanks and the like, such as in chemical plants, sewage treatment systems, swimming pools and in agriculture or aquaculture.

I claim:

1. An adapter for selectively attaching either one of a first hose or a second hose, having a smaller diameter than said first hose, to port means having a diameter corresponding substantially to said smaller diameter hose, comprising: a substantially rigid tubular member having a thread at a first end thereof, adapted to be releasably engaged with a complementary thread in said port, and a thread at a second end thereof adapted to be releasably engaged with a threaded fitting at one end of said second hose; and one half of a quick-locking coupling comprising a locking ring and a sealing ring securely and concentrically mounted on said tubular member, intermediate the ends thereof, and adapted to receive and releasably engage a complementary half of said quick-locking coupling at one end of said first hose.

2. An adapter as claimed in claim 1, including swivel ring means rotatably mounted at said first end of said tubular member and including female thread means for releasable connection to said complementary thread in said port means.

3. An adapter as claimed in claim 1, wherein said thread at said first end of said tubular member is a male thread adapted to releasably engage with said complementary thread in said port means, and said thread at said second end of said tubular means is a female thread adapted for releasable attachment to said threaded fitting at one end of said second hose.

4. An adapter as claimed in claim 3, including swivel ring means rotatably mounted at said second end of said tubular member and including female thread means for releasable connection to said threaded fitting at said one end of said second hose.

5. A fire hydrant having a plurality of ports of selected diameter and including adapter means for selectively attaching either one of a first hose or a second hose, having a smaller diameter than said first hose, to a selected one of said ports having a diameter corresponding substantially to said smaller diameter hose, said adapter means comprising: a substantially rigid tubular member having a thread at a first end thereof, adapted to be releasably engaged with a complementary thread in said selected one of said ports, and a thread at a second end thereof adapted to be releasably engaged with a threaded fitting at one end of said second hose; and one half of a quick-locking coupling, comprising a locking ring and a sealing ring, securely and concentrically mounted on said tubular member, intermediate the ends thereof, and adapted to receive and releasably engage a complementary half of said quick-locking coupling at one end of said first hose.

6. A fire hydrant as claimed in claim 5 and including cover means releasably secured over said thread at said second end of said tubular member so as to prevent damage to said thread.

7. A fire hydrant as claimed in claim 6 including tether means to secure said cover means to said hydrant.

\* \* \* \* \*